United States Patent Office 3,139,389
Patented June 30, 1964

3,139,389
METHOD OF PRODUCING CEPHALOSPORIN C
Thomas Boyne Platt, Neshanic Station, and William Robert Frazier, New Brunswick, N.J., assignors to Olin Mathieson Chemical Corporation, New York, N.Y., a corporation of Virginia
No Drawing. Filed Jan. 4, 1963, Ser. No. 249,321
6 Claims. (Cl. 195—36)

This invention relates to an improved method for preparing cephalosporin C and more particularly to an improvement in the method for preparing cephalosporin C microbiologically.

Prior to this invention, it was known that cephalosporin C could be prepared microbiologically by the action of certain species and strains of microorganisms of the genus Cephalosporium. Among such strains are Cephalosporium sp. strain CMI 49137 and mutants thereof, such as mutant 8650. Prior to this invention it was also believed that to obtain maximum yields of the desired cephalosporin C, a methionine had to be added to the nutrient medium. By "a methionine" is meant DL-methionine, D-methionine, L-methionine, and compounds which probably are converted to methionine in situ, such as methionine sulfoxide, L-cysteine, and S-methyl-L-cysteine.

It has now been found that cephalosporin C can be obtained in high yield by culturing a cephalosporin C producing strain of Cephalosporium in a nutrient medium containing a cycloalkanone either alone or preferably in addition to a methionine. Among the suitable cycloalkanones those particularly preferred are cyclopentanone and cyclohexanone. The cycloalkanone is preferably present in a concentration of about 0.01% to about 0.4%, weight by volume of the total fermentation medium, and optimally about 0.05% to about 0.2%.

Although one feature of the instant invention is the unexpected discovery that a cycloalkanone can be used to replace a methionine in a cephalosporin C fermentation, to obtain maximum yields of cephalosporin C, a methionine is preferably also added to the medium. In this event, the methionine is added to a concentration of about .01% to about 1.5% and optimally about 0.03% to about 0.1%.

The fermentation medium otherwise contains the normal nutrients previously used in microbial production of cephalosporin C. Thus, the medium contains an assimilable source of carbon and energy, such as a carbohydrate (e.g., sucrose, lactose, glucose and the like) and a source of nitrogen, such as meat extract, fish meal, cornsteep liquor and peanut meal. The microorganism is grown in or on the aqueous nutrient medium under aerobic conditions for about 3 to about 6 days, optimally about 4 to about 5 days, at a temperature in the range of about 23° C. to about 27° C., after which the antibiotics are recovered from the medium in the usual manner. In addition to producing cephalosporin C, the fermentation usually results in the coproduction of penicillin N and cephalosporin P, which can be separated from the desired cephalosporin C in the usual manner.

To show the utilization of cycloalkanones in the production of cephalosporin C, comparative experiments were conducted as indicated in the following table and the potency of the resulting fermentation broths measured. In all these tests the same general procedure was used, omitting or adding cyclopentanone, cyclohexanone, DL-methionine, and/or L-cysteine as indicated.

To prepare the fermentation medium, an inoculum obtained by growing Cephalosporium sp. strain CMI 49137, mutant 8650 (obtained from the Antiobiotics Research Station, Clevedon, Somerset, England) was grown for 72 hours with shaking in 100 ml. of a sterile aqueous medium containing 4% cornsteep liquor, 2% lactose, 0.5% glucose, 0.3% $NaNO_3$, 0.05% $K_2HPO_4$ and 0.025% $MgSO_4.7H_2O$. This culture was used to inoculate a 250 ml. Erlenmeyer flask containing 50 ml. of the following sterile aqueous medium: 2% Pharmamedia (a cottonseed-derived protein nutrient sold by Traders Oil Mill Company, Forth Worth, Texas), a 2% peanut meal, 4% lactose, 1.0% $CaCO_3$, 0.2% $CaSO_4$, and 0.1% $Na_2SO_4$. The flask was then incubated at 25° C. for 5 days on a rotary shaker operated at 280 revolutions per minute.

The antibiotic potencies of the fermentation broth were determined with an agar diffusion assay using *Salmonella gallinarum* as the test organism. This organism is insensitive to the cephalosporin P antibiotics. The cephalosporin C potency is equivalent to the antibiotic activity remaining after treatment of broth dilutions with 125 units per ml. of Penicillinase A (Riker Laboratories, Inc., Northridge, California) to eliminate the antiobiotic activity of penicillin N. Penicillin N potency is estimated by the difference between the total and penicillinase-resistant antiobiotic activities.

The following table shows the results of the various experiments, a plus sign (+) indicates that the compound in question was added at a concentration of 0.05% weight by volume, a minus sign (—) indicates that the compound was not added:

Table

| Example | Cyclopentanone | Cyclohexanone | DL-Methionine | L-Cysteine | Antibiotic Potency (in micrograms/ml.) | |
|---|---|---|---|---|---|---|
| | | | | | Cephalosporin C | Penicillin N |
| 1 | — | — | — | — | 370 | 170 |
| 2 | — | — | + | — | 500 | 300 |
| 3 | — | — | — | + | 530 | 180 |
| 4 | + | — | — | — | 580 | 300 |
| 5 | — | + | — | — | 570 | 320 |
| 6 | + | — | + | — | 620 | 360 |
| 7 | — | + | + | — | 630 | 360 |
| 8 | + | — | — | + | 660 | 400 |

This table shows that cyclopentanone and cyclohexanone can be used to replace methionine and cysteine in the production of cephalosporin C. This result is surprising in view of the prior state of art and the findings of others that all attempts to substitute for methionine other compounds, except those which presumably are convertible to methionine in situ, failed to yield cephalosporin C in satisfactory amounts [see Demain et al., Applied Microbiology, vol. 10, pp. 321–325 (1962)].

This invention may be variously otherwise embodied within the scope of the appended claims.

What is claimed is:
1. In a method for producing cephalosporin C by culturing a cephalosporin C producing strain of Cephalosporium in a nutrient medium, the improvement which comprises adding a cycloalkanone selected from the group consisting of cyclopentanone and cyclohexanone and a methionine to said medium.
2. The method of claim 1 wherein the cycloalkanone is added in a proportion of about 0.01% to about 0.4% and the methionine is added in a proportion of about 0.01% to about 1.5%, both by weight based on the total volume of the medium.
3. In a method for producing cephalosporin C by culturing a cephalosporin C producing strain of Cephalosporium in a nutrient medium, the improvement which comprises adding a cycloalkanone selected from the group consisting of cyclopentanone and cyclohexanone and a methionine selected from the group consisting of DL-methionine and L-cysteine to said medium.

4. The method of claim 3 wherein the cycloalkanone is added in a proportion of about 0.01% to about 0.4% and the methionine is added in a proportion of about 0.01% to about 1.5%, both by weight based on the total volume of the medium.

5. In a method for producing cephalosporin C by culturing a cephalosporin C producing strain of Cephalosporium in a nutrient medium, the improvement which comprises adding cyclopentanone to said medium.

6. In a method for producing cephalosporin C by culturing a cephalosporin C producing strain of Cephalosporium in a nutrient medium, the improvement which comprises adding cyclohexanone to said medium.

References Cited in the file of this patent

UNITED STATES PATENTS

| | | |
|---|---|---|
| 2,768,117 | Kaplan | Oct. 23, 1956 |
| 2,831,797 | Miller et al. | Apr. 22, 1958 |
| 2,883,328 | Florey et al. | Apr. 21, 1959 |
| 3,116,216 | Demain | Dec. 31, 1963 |
| 3,116,217 | Demain | Dec. 31, 1963 |